United States Patent
Klamerus

(10) Patent No.: US 7,413,757 B2
(45) Date of Patent: Aug. 19, 2008

(54) METHOD OF MAKING A COLORED, FLOUR-BASED FOOD PRODUCT AND PRODUCT THEREOF

(75) Inventor: Beata Z. Klamerus, Chicago, IL (US)

(73) Assignee: The Quaker Oats Company, Chicago, IL (US)

(*) Notice: Subject to any disclaimer, the term of this patent is extended or adjusted under 35 U.S.C. 154(b) by 383 days.

(21) Appl. No.: 11/227,633

(22) Filed: Sep. 15, 2005

(65) Prior Publication Data

US 2007/0059412 A1    Mar. 15, 2007

(51) Int. Cl.
*A21D 2/38* (2006.01)
*A23L 1/164* (2006.01)

(52) U.S. Cl. .................... 426/250; 426/620; 426/622

(58) Field of Classification Search .......... 426/250, 426/262, 268, 270, 540, 615, 618, 619, 620, 426/621, 442, 496, 622
See application file for complete search history.

(56) References Cited

U.S. PATENT DOCUMENTS

| | | | |
|---|---|---|---|
| 4,060,645 A * | 11/1977 | Risler et al. | 426/302 |
| 4,181,747 A * | 1/1980 | Kickle et al. | 426/615 |
| 4,409,254 A * | 10/1983 | Garin et al. | 426/540 |
| 5,296,253 A * | 3/1994 | Lusas et al. | 426/629 |
| 6,129,937 A | 10/2000 | Zurbriggen et al. | |
| 6,174,553 B1 | 1/2001 | Cerda et al. | |
| 6,287,621 B1 | 9/2001 | Lacourse et al. | |
| 6,291,008 B1 | 9/2001 | Robie et al. | |
| 6,419,972 B1 | 7/2002 | Akimoto et al. | |
| 6,528,104 B1 | 3/2003 | Jindra et al. | |
| 6,746,702 B1 | 6/2004 | Robie | |
| 6,770,316 B2 | 8/2004 | Jindra et al. | |
| 6,913,775 B2 | 7/2005 | Ballman et al. | |
| 2001/0051198 A1 | 12/2001 | Robie et al. | |
| 2002/0102338 A1 | 8/2002 | Knudsen | |
| 2002/0187230 A1 | 12/2002 | Krochta et al. | |
| 2003/0124235 A1 | 7/2003 | Yukawa et al. | |
| 2003/0152667 A1 | 8/2003 | Goedeken et al. | |
| 2004/0037941 A1 | 2/2004 | Knudsen | |
| 2004/0265469 A1 | 12/2004 | Neidlinger et al. | |
| 2005/0064079 A1 | 3/2005 | Allen et al. | |
| 2005/0129817 A1 | 6/2005 | Malecha et al. | |
| 2005/0181101 A1 * | 8/2005 | Harada et al. | 426/250 |

OTHER PUBLICATIONS

Natural Colors, Food Additives: Ameliorating the Flavors, Enriching the Food (Jan. 29, 2005), at http://web.archive.org/web/20050129013412/http://www.foodadditivesworld.com/natural-colors.html.*

* cited by examiner

*Primary Examiner*—Arthur L Corbin
(74) *Attorney, Agent, or Firm*—Banner & Witcoff, Ltd.

(57) ABSTRACT

A method of making a color-stable, cooked, flour-based food that is, for example, a RTE cereal or snack food that can be colored red with all natural ingredients is provided. A colored flour mixture is provided that is colored with natural ingredients suitable for making a cooked, ready-to-eat, color-stable, color-based food product. The food product may be a ready-to-eat cereal or a snack food, for example. In addition, a color-stable, cooked, ready-to-eat, flour-based food product that can be colored red with natural ingredients is provided.

20 Claims, 1 Drawing Sheet

METHOD OF MAKING A COLORED, FLOUR-BASED FOOD PRODUCT AND PRODUCT THEREOF

FIELD OF THE INVENTION

The present invention relates to food products, including cereals and snacks. More particularly, the present invention relates to ready-to-eat cereals and snacks that can be made from all natural ingredients.

BACKGROUND OF THE INVENTION

Ready-to-eat ("RTE") food products, including cereals and various types of snacks based on grain or flour are generally known. RTE foods, including cereals may be in, for example, a variety of forms, including flake, biscuit and puffed pieces. One convenient method of making such RTE foods, including cereals and snacks involves use of an extruder operating under relatively high temperature and pressure.

A need exists for ready-to-eat foods, including cereals and snack foods that are made with natural coloring agents and which can be made with all natural ingredients. In addition, a need exists for such RTE products based on grain or flour that are colored with such natural ingredients in which the product is color-stable and even more desirably in which the product is entirely composed of natural ingredients.

SUMMARY OF THE INVENTION

In accordance with one aspect of the present invention, a method of making a color-stable, cooked, flour-based food that is, for example, a RTE cereal or snack food that is colored with all natural ingredients is provided. The food may be composed entirely of natural ingredients. The method includes, in one aspect, forming a flour mixture containing a vegetable extract having a color different from the color of the flour. The vegetable extract is present in an amount sufficient to provide the color of the vegetable extract to the flour mixture and the flour mixture typically will have a pH in the range of about 4.0 or less. Thereafter, the colored flour mixture is cooked under suitable conditions to form a food product, such as, for example, a ready-to-eat cereal or snack food product that has the color of the vegetable extract and is color stable. By "color stable" is meant that the food product does not change color as a result of production, storage in normal storage conditions and typically does not significantly change color as a result of exposure to aqueous liquids such as milk. The color intensity of the vegetable extract may be of greater intensity than the color intensity when present in the food product.

Thereafter, if desired, flavor and/or a coating can be applied to the food product.

In accordance with another aspect of the present invention, a method of making a red, color-stable, cooked, ready-to-eat, grain- or flour-based food product colored with natural ingredients is provided. The method includes forming a flour mixture containing a red vegetable extract in an amount sufficient to provide a red color to the flour mixture. Typically, the flour mixture will have a pH in the range of about 4.0 or less. Thereafter, the colored flour mixture is cooked in a suitable manner to form a cooked, red, color-stable, ready-to-eat cereal or snack food product.

Typically, the cooking of the flour mixture will be under elevated temperature and pressure in which a gelatinized dough is formed and cooked to produce the cooked, ready-to-eat cereal or snack food product. While not wishing to be bound by theory, it is believed that cooking the flour mixture with the vegetable extract fixes the color of the resulting cooked food product and results in a color-stable material. As is well known, the processing and cooking of such a flour mixture can occur in an extruder.

In accordance with another aspect of the present invention, the flour mixture is acidified with a food grade acid such that the flour mixture has a pH of about 4.0 or less. The food grade acid may be a fruit acid. In another embodiment, the food grade acid is selected from malic acid, citric acid, acetic acid and mixtures thereof.

Preferably, the vegetable extract is deodorized to remove any undesirable or objectionable odors, particularly if the function of the vegetable extract is to provide color and not flavor or aroma. Examples of suitable vegetable extracts include, for example, red radish, red cabbage, red beet and mixtures thereof. The extract may be a vegetable juice and can be a concentrated or a dried juice.

In accordance with another aspect of the invention, a colored flour mixture is provided that is colored with natural ingredients suitable for making a cooked, ready-to-eat, color-stable, color-based food product. The food product may be a ready-to-eat cereal or a snack food, for example. The colored flour mixture is suitable for processing and cooking in an extruder. The colored flour mixture comprises flour, sugar, salt and optionally natural flavors, a colored vegetable extract having a color different from the color of the flour, resulting in a flour mixture having a pH of about 4.0 or less. The flour mixture may further comprise a food grade acid. The food grade acid may be selected from malic acid, citric acid, acetic acid and mixtures thereof.

In accordance with another aspect of the invention, a red flour mixture is provided that is colored with natural ingredients and is suitable for making a cooked, ready-to-eat, color-stable, flour-based food product that may be, for example, either a cereal or a snack food. The red flour mixture comprises flour, sugar, optionally natural flavors, a red vegetable extract that is preferably selected from red radish extract, red cabbage extract, red beet extract and mixtures thereof.

In accordance with another aspect of the present invention, a color-stable, cooked, ready-to-eat, flour-based food product that is colored with natural ingredients is provided. The food product comprises flour, sugar, optionally natural flavors, a vegetable extract having a color different from the color of the flour. In one embodiment, the food product contains a vegetable extract selected from red radish extract, red cabbage extract and red beet extract. The food product may have flavor or a coating of desired material applied on the surface thereof. Such materials can be applied by any suitable method and suitable apparatus, including by a spray dryer, for example.

In accordance with another aspect of the present invention, a red, color-stable, cooked, ready-to-eat, flour-based food product is provided that is colored with only natural ingredients. The product comprises flour, sugar, natural flavors and red vegetable extract.

In accordance with a more specific aspect of the invention, the red vegetable extract used in the method, flour and product of the present invention is selected from the group consisting of red radish, red cabbage, red beet and mixtures thereof. In accordance with another embodiment of the invention, the extract is vegetable juice. Preferably, if red radish extract is used, a known variety of red radish is selected that has a deep red color that extends through the body of the radish.

DETAILED DESCRIPTION OF THE INVENTION

Figure 1:
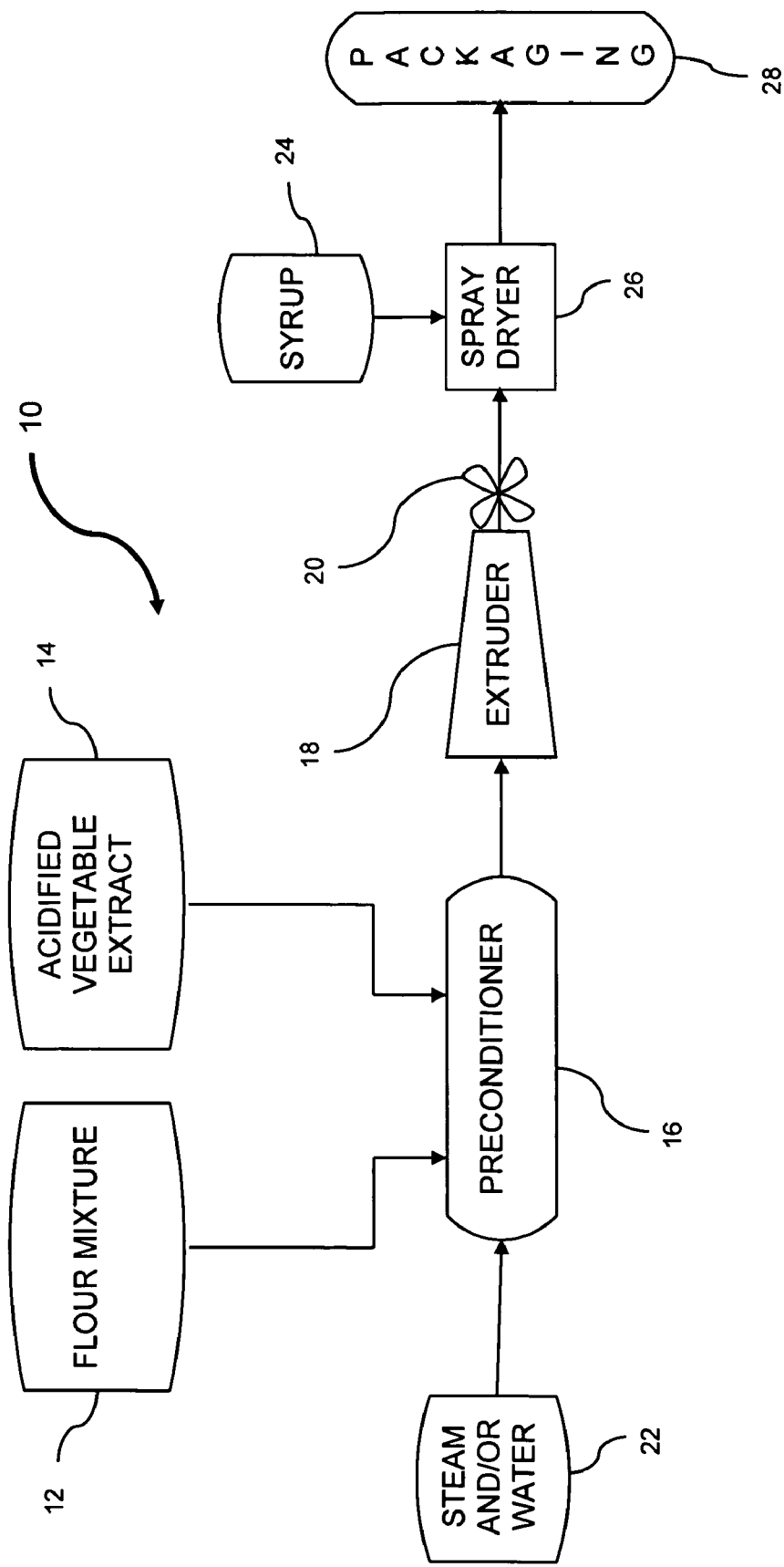
FIG. 1 is a schematic diagram illustrating the process and system in accordance with the present invention.

The present invention provides a cooked, ready-to-eat, flour-based food product that is colored and color stable. It has a color different from the color of the flour. The color is due to the presence of a vegetable extract that is present in an amount sufficient to provide the color of the vegetable extract of the flour mixture. Typically, the flour mixture will have a pH in the range of about 4.0 or less.

The colored flour mixture is cooked under suitable conditions to form a cooked food product that is flour based, such as a ready-to-eat cereal or snack food product, for example.

Referring to FIG. 1, there is illustrated a system and method 10 according to the present invention. The system and method comprises providing a source of a suitable flour mixture 12. Flour mixture 12 may be composed of any suitable flour as desired and may include corn flour, wheat flour, oat flour, as well as other flours and mixtures thereof, for example. Flour mixture 12 may also include sugar which can be present in any suitable form such as molasses which may be unsulphured molasses as well as honey, other sources of sugar that are known in the art and mixtures thereof. Flour mixture 12 may also include other natural and/or artificial materials, including salt, flavors, vitamins and minerals as desired. In addition, or as an alternative, flavors, including sweeteners may be applied to the surface of the cooked food pieces, as hereafter described.

A source of an acidified vegetable extract 14 is also provided. The acidified vegetable extract is the natural colorant for the resulting food product. Acidified vegetable extract 14 preferably is selected from the group consisting of red radish extract, red cabbage extract, red beet extract and mixtures thereof. A particularly preferred red vegetable extract is red radish extract, preferably obtained from red radishes that have a deep red color extending through the body of the radish. In one embodiment, the vegetable extract may be the juice of the vegetable.

The acidified vegetable extract is acidified with a suitable acid which should be a food grade acid and may be a fruit acid. Suitable acids include, for example, malic acid, citric acid, acetic acid and mixtures thereof.

System 10 may be designed to be operated on a continuous or a batchwise basis, for example. Generally, in operation, flour mixture 12 and acidified vegetable extract 14 is fed to a preconditioner 16. Preconditioner 16 may be a paddle mixer for mixing all of the aforesaid materials together to form a uniform free-flowing wet solid material. Steam and/or water 22 can be added to preconditioner 16, which can be operated to have a residence time of 2-5 minutes, for example. Typically, the free-flowing wet solid material composed of the aforesaid ingredients will have a water or moisture content as desired and appropriate for the product being made. For ready-to-eat cereal that is to be extruder processed, typically the material will have a moisture content of approximately 18%±about 2%. The free-flowing wet solid material is then introduced into extruder 18 to heat and cook the free-flowing wet solid material under elevated temperature and pressure. The free-flowing wet solid material is transformed in extruder 18 into a cereal dough which is cooked in the extruder. Extruder 18 heats the food components to a desired temperature for extruder cooking and processing which may be in the range of, for example, 330° F. to 350° F. Upon exiting extruder 18 the cooked food product expands and is cut into pieces of desired length by a suitable cutting mechanism 20, examples of which are well known in the art. For example, cutting mechanism 20 may be a reciprocating or rotary cutting device shown schematically in FIG. 1.

Thereafter, if desired, the individual food pieces can have flavors and/or a coating applied to the surface thereof. These materials can be applied by any suitable method and apparatus, including, for example, by a spray dryer 26 in which the additional material, which can be a syrup provided by a source of syrup 24, is sprayed onto the food pieces and dried. Spray dryer 26 may be composed of a rotating drum in which the syrup is sprayed on the food pieces and thereafter the food pieces are dried in a dryer. Thereafter, the coated food pieces can be suitably packaged at packaging station 28.

In operation of system and method 10, the preconditioned ingredient mixture that exits preconditioner 16 has a pH of about 4.0 or less. Typically, a suitable amount of a food grade acid will be added to preconditioner 16 to achieve the desired pH. The acid may be present in acidified vegetable extract 14. Suitable food grade acids include, for example, malic acid, citric acid, acetic acid and mixtures thereof. While not wishing to be bound by theory, it is believed that the preconditioned mixture having the specified pH causes the vegetable extract coloring to be stabilized which stabilized color is fixed during cooking which may be by extruder 18 or some other cooking mechanism as is known to those skilled in the art.

In accordance with another embodiment of the present invention, the acidified vegetable extract could be injected into the inlet or feed of extruder 18. Alternatively, the acidified vegetable extract could be injected downstream of the extruder feed location. Similarly, acidified vegetable extract 14 could be injected or added into any suitable flour-based cooking device to form a colored food product upon cooking.

In accordance with another aspect of the present invention, the flour mixture is acidified with a food grade acid such that the flour mixture has a pH of about 4.0 or less. The food grade acid may be a fruit acid. In another embodiment, the food grade acid is selected from malic acid, citric acid, acetic acid and mixtures thereof.

Preferably, the vegetable extract is deodorized to remove any undesirable or objectionable odors, particularly if the function of the vegetable extract is to provide color and not flavor or aroma. Examples of suitable vegetable extracts include, for example, red radish, red cabbage, red beet and mixtures thereof. The extract may be a vegetable juice and can be a concentrated or a dried juice.

In accordance with another aspect of the invention, a colored flour mixture is provided that is colored with natural ingredients suitable for making a cooked, ready-to-eat, color-stable, color-based food product. The food product may be a ready-to-eat cereal or a snack food, for example. The colored flour mixture is suitable for processing and cooking in an extruder. The colored flour mixture comprises flour, sugar, salt and optionally natural flavors, a colored vegetable extract having a color different from the color of the flour, resulting in a flour mixture having a pH of about 4.0 or less. The flour mixture may further comprise a food grade acid. The food grade acid may be selected from malic acid, citric acid, acetic acid and mixtures thereof.

In accordance with another aspect of the invention, a red flour mixture is provided that is colored with natural ingredients and is suitable for making a cooked, ready-to-eat, color-stable, flour-based food product that may be, for example, either a cereal or a snack food. The red flour mixture comprises flour, sugar, optionally natural flavors, a red vegetable extract that is preferably selected from red radish extract, red cabbage extract, red beet extract and mixtures thereof.

In accordance with another aspect of the present invention, a color-stable, cooked, ready-to-eat, flour-based food product that is colored with natural ingredients is provided. The food product comprises flour, sugar, optionally natural flavors, a vegetable extract having a color different from the color of the flour. In one embodiment, the food product contains a vegetable extract selected from red radish extract, red cabbage extract and red beet extract. The food product may have flavor or a coating of desired material applied on the surface thereof. Such materials can be applied by any suitable method and suitable apparatus, including by a spray dryer, for example.

In accordance with another aspect of the present invention, a red, color-stable, cooked, ready-to-eat, flour-based food product is provided that is colored with only natural ingredients. The product comprises flour, sugar, natural flavors and red vegetable extract.

In accordance with a more specific aspect of the invention, the red vegetable extract used in the method, flour and product of the present invention is selected from the group consisting of red radish, red cabbage, red beet and mixtures thereof. In accordance with another embodiment of the invention, the extract is vegetable juice. Preferably, if red radish extract is used, a known variety of red radish is selected that has a deep red color that extends through the body of the radish.

One suitable red radish extract is available from Food Ingredient Solutions LLC of Blauvelt, N.Y. under the trade designation Vegetable Juice Color 6003GFM.

The present invention can be more completely understood by reference to the following example.

EXAMPLE

A ready-to-eat flour-based food product composed of all natural ingredients in accordance with the invention can be made having the following ingredients and amounts in the base mix:

| Ingredient | Amount (Parts by Weight) |
| --- | --- |
| Flour | 60.7 |
| Sugar (which can be composed of honey and/or molasses) | 3.5 |
| Red Radish Extract* | 1.9 |
| Malic Acid (anhydrous) | 0.37 |
| Salt and Flavors | 1.2 |

*The red radish extract is filtered and deodorized, acidified with citric acid to a pH of 4.0, and is composed of about 5% red radish juice powder concentrate, about 54% water and about 40% glycerin, all by weight.

A preconditioned flour mixture of the foregoing composition is formed in a preconditioner with the specified ingredients and added steam or water to result in a fixed moisture content of about 18%. The preconditioned mixture as a free-flowing wet solid and can be introduced into an extruder at, for example, a temperature of about 125° F. and processed through the extruder which operated at a temperature of up to about 350° F. Upon exiting the extruder the cooked resulting product is cut into individual pieces to form a cooked ready-to-eat cereal having a stable red color. Typically, the range of the flour and vegetable extract present in the composition will be in the range of from about 50 to about 70 parts by weight flour and from about 0.5 to about 10, and more typically, about 1 to about 8 parts vegetable extract.

The RTE cereal pieces can be coated with a suitable coating as desired, which may be a sweetened syrup. One suitable syrup has the formula:

| Ingredient | Amount (Parts by Weight) |
| --- | --- |
| Sugar | 23.3 |
| Process Water | 7.8 |
| Flavor | 0.46 |
| Malic Acid (anhydrous) | 0.32 |
| Red Radish Color | 0.78 |

The syrup ingredients are blended together and applied at elevated temperature to the surface of the cereal pieces from the extruder. This can be done in a spray dryer, for example. Thereafter, the cereal pieces are dried, cooked and packaged.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

The invention claimed is:

1. A method of making a color-stable, cooked, ready-to-eat, flour-based food product that is colored with natural ingredients comprising: forming a flour mixture comprising a deodorized, red vegetable extract having a color different from the color of the flour in an amount sufficient to provide the color of the vegetable extract to the flour mixture without imparting flavor or aroma to the flour mixture, the flour mixture having a pH of about 4.0 or less, the deodorized, red vegetable extract selected from the group consisting of red radish extract, red cabbage extract, and red beet extract, and mixtures thereof; and cooking the flour mixture to produce a cooked, ready-to-eat cereal that is devoid of flavor or aroma from the vegetable extract.

2. The method of claim 1 wherein the pH of the flour mixture is about 4.0.

3. The method of claim 1 wherein the vegetable extract is present in the flour mixture in an amount of from about 2 to about 5% by weight of the total flour mixture.

4. The method of claim 1 wherein the vegetable extract is red radish extract and is present in the flour mixture in an amount of from about 2 to about 5% by weight of the total flour mixture.

5. The method of claim 4 wherein the red radish extract is red radish juice.

6. The method of claim 1 wherein the flour mixture is acidified with a food grade acid.

7. The method of claim 1 wherein the flour mixture is acidified with a food grade acid selected from the group consisting of malic acid, citric acid, acetic acid and mixtures thereof.

8. The method of claim 1 wherein the flour mixture is acidified with malic acid.

9. A method of making a red, color-stable, cooked, ready-to-eat, flour-based food product that is colored with natural ingredients comprising: forming a flour mixture comprising a deodorized, red vegetable extract in an amount sufficient to provide a red color to the flour mixture, the flour mixture having a pH of about 4.0 or less, the deodorized, red vegetable extract selected from the group consisting of red radish extract, red cabbage extract, and red beet extract, and mixtures thereof; and extruding the flour mixture under high shear and pressure to form a dough and to cook the dough to produce a cooked, red, ready-to-eat cereal that is devoid of flavor or aroma from the vegetable extract.

10. The method of claim 9 wherein the red vegetable extract is red radish extract.

11. A colored flour mixture suitable for making a cooked, ready-to-eat, color-stable, flour-based food product comprising: flour, sugar, a deodorized, red vegetable extract having a color different from the color of the flour, the deodorized, red vegetable extract selected from the group consisting of red radish extract, red cabbage extract, and red beet extract, and mixtures thereof; said colored flour mixture having a pH of about 4.0 or less and being devoid of flavor or aroma from the vegetable extract.

12. The flour mixture of claim 11 wherein the deodorized, red vegetable extract is red radish extract.

13. The flour mixture of claim 12 wherein the red radish extract is deodorized red radish juice.

14. The flour mixture of claim 11 further comprising a food grade acid.

15. The flour mixture of claim 11 further comprising a food grade acid selected from the group consisting of malic acid, citric acid, acetic acid and mixtures thereof.

16. The flour mixture of claim 11 further comprising malic acid.

17. A color-stable, cooked, ready-to-eat, flour-based food product that is colored with natural ingredients comprising: flour, sugar, natural flavors and a deodorized, red vegetable extract having a color different from the color of the flour, the deodorized, red vegetable extract selected from the group consisting of red radish extract, red cabbage extract, and red beet extract, and mixtures thereof, the food product being devoid of flavor or aroma from the vegetable extract.

18. The food product of claim 17 wherein the deodorized, red vegetable extract is red radish extract.

19. The food product of claim 17 wherein the flour-based food product is a ready-to-eat cereal.

20. The food product of claim 17 wherein the flour-based food product is a snack food.

* * * * *